United States Patent
Mueller et al.

(10) Patent No.: US 9,512,682 B2
(45) Date of Patent: Dec. 6, 2016

(54) WIRED PIPE AND METHOD OF MANUFACTURING WIRED PIPE

(71) Applicants: Stephan Mueller, Hannover (DE); Kai Schoenborn, Lachendorf (DE)

(72) Inventors: Stephan Mueller, Hannover (DE); Kai Schoenborn, Lachendorf (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 265 days.

(21) Appl. No.: 14/087,422

(22) Filed: Nov. 22, 2013

(65) Prior Publication Data

US 2015/0144324 A1 May 28, 2015

(51) Int. Cl.
| | | |
|---|---|---|
| *E21B 17/00* | (2006.01) | |
| *B29C 47/20* | (2006.01) | |
| *B29C 47/00* | (2006.01) | |
| *B29L 23/00* | (2006.01) | |
| *B29L 24/00* | (2006.01) | |

(52) U.S. Cl.
CPC ............. *E21B 17/003* (2013.01); *B29C 47/20* (2013.01); *B29C 47/0023* (2013.01); *B29C 47/0028* (2013.01); *B29L 2023/22* (2013.01); *B29L 2024/006* (2013.01)

(58) Field of Classification Search
CPC ......... E21B 17/00; E21B 17/003; E21B 17/18
See application file for complete search history.

(56) References Cited

U.S. PATENT DOCUMENTS

| | | | |
|---|---|---|---|
| 4,095,865 A | 6/1978 | Denison et al. | |
| 4,121,193 A | 10/1978 | Denison | |
| 4,220,381 A | 9/1980 | Van Der Graaf | |
| 4,788,544 A | 11/1988 | Howard | |
| 4,884,071 A | 11/1989 | Howard | |
| 5,748,565 A | 5/1998 | Cherbettchian et al. | |
| 7,017,667 B2 | 3/2006 | Hall et al. | |
| 7,291,303 B2 | 11/2007 | Hall et al. | |
| 7,311,154 B2* | 12/2007 | Cho | E21B 17/026 166/241.1 |
| 7,777,644 B2 | 8/2010 | Madhavan et al. | |
| 7,859,426 B2 | 12/2010 | Clark et al. | |
| 2002/0119271 A1 | 8/2002 | Quigley et al. | |
| 2004/0020659 A1 | 2/2004 | Hall et al. | |
| 2004/0150533 A1 | 8/2004 | Hall | |
| 2004/0244964 A1 | 12/2004 | Hall et al. | |

(Continued)

FOREIGN PATENT DOCUMENTS

| | | |
|---|---|---|
| WO | 2010115492 A2 | 10/2010 |
| WO | 2012116984 A2 | 9/2012 |
| WO | 2013053449 A2 | 4/2013 |

OTHER PUBLICATIONS

Notification of Transmittal of the International Search Report and the Written Opinion of the International Searching Authority; PCT/US2014/066841; Mailed Feb. 26, 2015; ISR 6 pages; WO 9 pages.

*Primary Examiner* — William P Neuder
(74) *Attorney, Agent, or Firm* — Cantor Colburn LLP

(57) ABSTRACT

A wired pipe includes a tubular pipe body having a wall. The wall including an inner surface, a flow channel formed by the inner surface, an outer surface, and at least one channel integrally formed within a thickness of the wall and between the inner and outer surfaces of the wall. Also included is a method of forming a wired pipe.

20 Claims, 8 Drawing Sheets

(56) References Cited

U.S. PATENT DOCUMENTS

| | | | |
|---|---|---|---|
| 2004/0262023 A1 | 12/2004 | Morrow et al. | |
| 2005/0023831 A1* | 2/2005 | Hughes | E21B 17/028 |
| | | | 285/330 |
| 2005/0045339 A1 | 3/2005 | Hall et al. | |
| 2005/0067159 A1 | 3/2005 | Hall et al. | |
| 2005/0189029 A1 | 9/2005 | Quigley et al. | |
| 2005/0263281 A1* | 12/2005 | Lovell | E21B 47/123 |
| | | | 166/255.1 |
| 2006/0151179 A1 | 7/2006 | Boyadjieff et al. | |
| 2006/0225926 A1 | 10/2006 | Madhavan et al. | |
| 2007/0159351 A1* | 7/2007 | Madhavan | E21B 17/003 |
| | | | 340/855.1 |
| 2008/0110638 A1 | 5/2008 | Hall et al. | |
| 2010/0264646 A1 | 10/2010 | Follini et al. | |
| 2011/0017334 A1* | 1/2011 | Peter | B21C 23/085 |
| | | | 138/103 |
| 2011/0155470 A1 | 6/2011 | Boulet et al. | |
| 2012/0048623 A1 | 3/2012 | Lafuente et al. | |
| 2013/0098605 A1 | 4/2013 | Dirksen et al. | |
| 2014/0196953 A1* | 7/2014 | Chitwood | E21B 33/1243 |
| | | | 175/57 |
| 2014/0209296 A1* | 7/2014 | Rahn | E21B 17/023 |
| | | | 166/242.6 |
| 2015/0260037 A1* | 9/2015 | Gajji | E21B 47/0006 |
| | | | 175/50 |

\* cited by examiner

WIRED PIPE AND METHOD OF MANUFACTURING WIRED PIPE

BACKGROUND

In the drilling and completion industry, the formation of boreholes for the purpose of production or injection of fluid is common. The boreholes are used for exploration or extraction of natural resources such as hydrocarbons, oil, gas, water, and alternatively for $CO_2$ sequestration. During subterranean drilling and completion operations, a pipe or other conduit is lowered into the borehole in an earth formation during or after drilling operations. Such pipes are generally configured as multiple pipe segments to form a string, such as a drill string or production string. As the string is lowered into the borehole, additional pipe segments are coupled to the string by various coupling mechanisms, such as threaded couplings.

Various power and/or communication signals may be transmitted through the pipe segments via a "wired pipe" configuration. Such configurations include electrical, optical, or other conductors extending along the length of selected pipe segments. The conductors are operably connected between pipe segments by a coupling configuration such as a pin box connection. One feature of a wired pipe system is that it can transmit data from a downhole location to the surface rapidly and vice versa.

Generally, in wired pipe configurations, one or more conductors such as wires or cables are run along the inside diameter of a typically steel pipe segment. Various configurations have been proposed to fix, secure, and armor a wire relative to the interior diameter surface of the pipe segment. The conductors require protection from drilling or production fluid and other objects (such as cementing darts) that are pumped downhole or flowing through the pipe segments. Mechanisms to protect the conductors include small diameter protective steel tubings. Although such tubings serve to protect the conductors, they represent a potential obstacle to efficient fluid flow and components such as wireline measurement tools and cementing equipment that are disposed in the pipe segments.

Due to increasing sophistication of downhole systems, the art would be receptive to alternative arrangements of wired pipes and methods of implementing wires in pipe.

SUMMARY

A wired pipe includes a tubular pipe body having a wall, the wall including an inner surface, a flow channel formed by the inner surface, an outer surface, and at least one channel integrally formed within a thickness of the wall and between the inner and outer surfaces of the wall.

A method of forming a wired pipe, the method includes extruding a tubular pipe body with a wall having an outer surface and an inner surface, the inner surface forming an interior flow channel; and, forming at least one channel through a thickness of the wall of the tubular pipe body, between the inner and outer surfaces.

BRIEF DESCRIPTION OF THE DRAWINGS

Referring now to the drawings wherein like elements are numbered alike in the several Figures.

DETAILED DESCRIPTION

Figure 1:
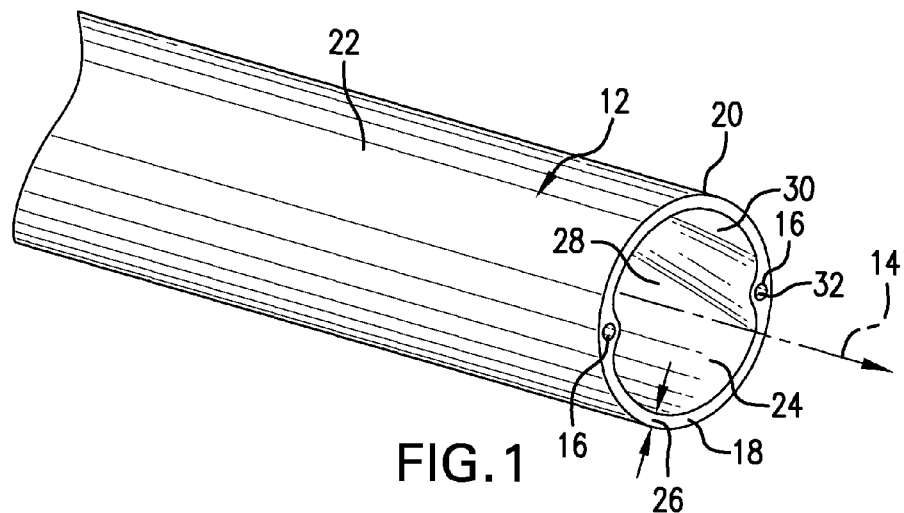
FIG. 1 shows a side perspective view of a portion of an exemplary embodiment of a pipe body for a wired pipe.
Figure 2:
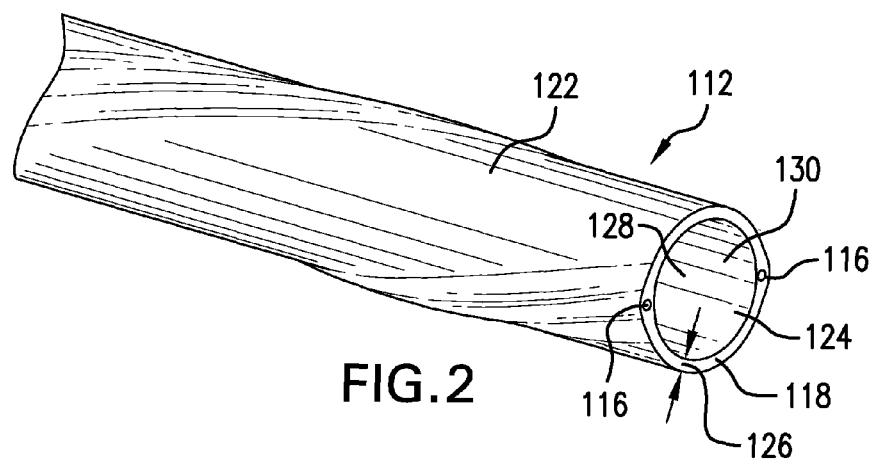
FIG. 2 shows a side perspective view of a portion of another exemplary embodiment of a pipe body for a wired pipe.
Figure 3:
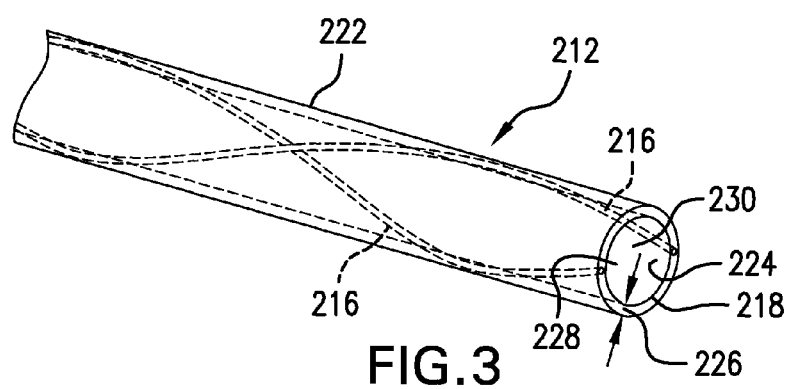
FIG. 3 shows a side perspective view of a portion of yet another exemplary embodiment of a pipe body for a wired pipe.
Figure 9:
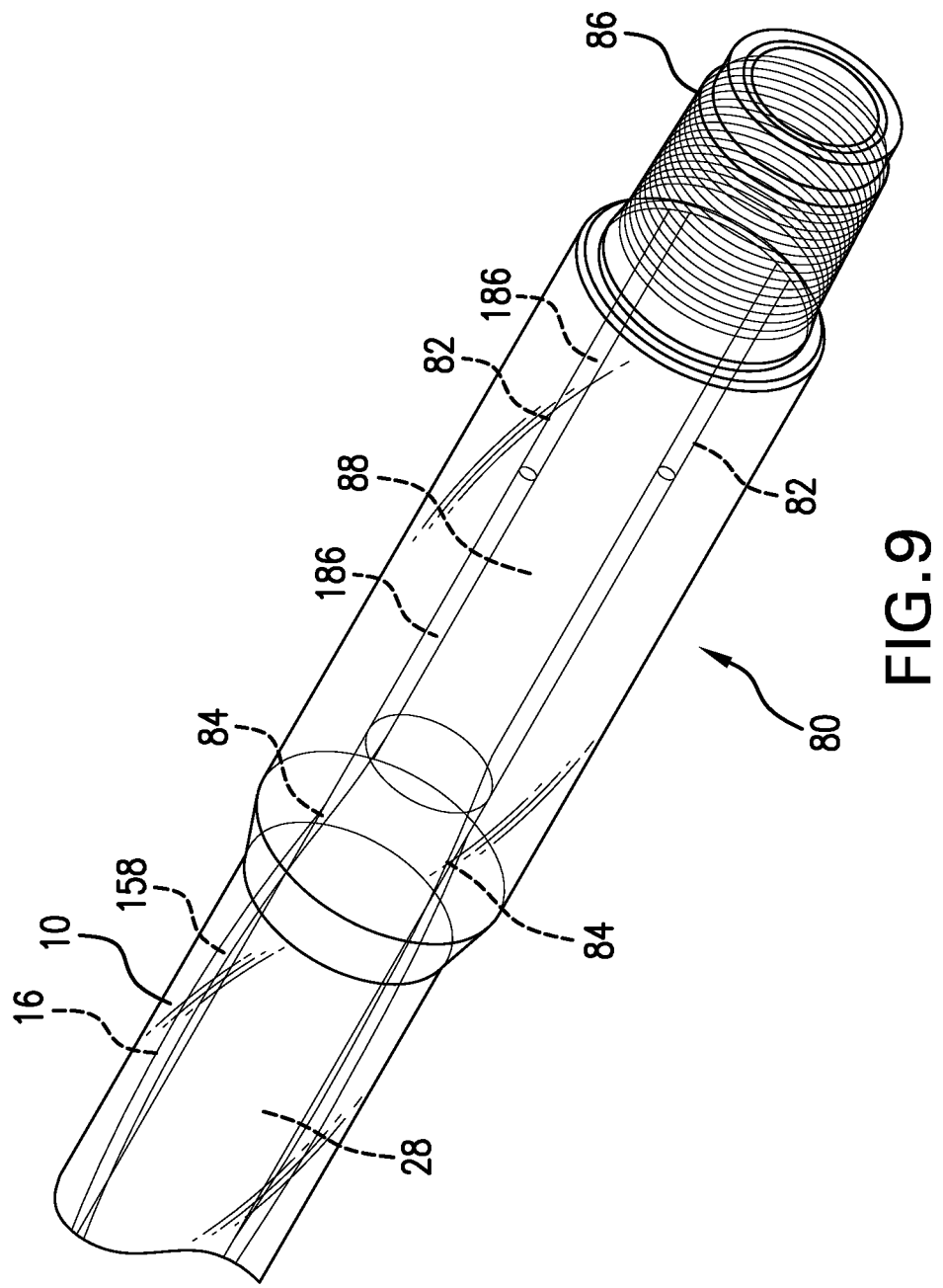
FIG. 9 shows a side perspective X-ray view of an exemplary embodiment of a tool joint attached to an exemplary embodiment of a wired pipe.

Exemplary embodiments of a wired pipe 10 (FIG. 9) utilize a tubular pipe body, as shown in FIGS. 1-3, with a signal communication channel for a transmission line, such as an insulated electrical conductor, wire, cable and/or optical fiber. The channel is formed during the manufacturing of the pipe body. FIG. 1 shows an exemplary embodiment of a pipe body 12 having a longitudinal axis 14 and one or more helical wire channels 16 formed within a wall 18 of the pipe body 12, from a first end 20 to a second end (not shown) of the pipe body 12. While the phrase "wire channel" is used, it should be understood that any line may be accommodated within the wire channel, such as, but not limited to, an insulated electrical conductor, wire, cable and/or optical fiber. The helical wire channel 16 is in the shape of a helix sharing the longitudinal axis 14 of the pipe body 12 and including one or more helical turns, depending on the length of the wired pipe 10. The helix angle of the helical wire channel 16 may be dependent upon the overall dimensions of the wired pipe 10. The wall 18 includes an outer surface 22 and an inner surface 24, and the helical wire channels 16 are formed between the outer and inner surfaces 22, 24 of the wall 18, within a thickness 26 of the wall 18. In the illustrated embodiment of FIG. 1, the thickness 26 of the wall 18 is greater at the locations of the helical wire channel 16, such that an inner diameter of the pipe body 12 is not constant and is smaller at locations where the wire channels 16 are located and greater where the wire channels 16 are not located. An outer diameter of the pipe body 12 is substantially constant. A flow channel 28 is provided within an interior 30 of the pipe body 12, the flow channel 28 surrounded by the inner surface 24 of the wall 18. The wall 18 of the pipe body 12 isolates the wire channels 16 from the flow channel 28.

FIG. 2 shows another exemplary embodiment of a pipe body 112 having one or more helical wire channels 116 formed within a wall 118 of the pipe body 112. The wall 118 includes an outer surface 122 and an inner surface 124, and the helical wire channels 116 are formed between the outer and inner surfaces 122, 124 of the wall 118. A thickness 126 of the wall 118 is greater at locations of the helical wire channels 116. An outer diameter of the pipe body 112 is not constant and is smaller at locations where the wire channels 116 are not located and greater where the wire channels 116 are located. An inner diameter of the pipe body 112 is substantially constant. A flow channel 128 is provided within an interior 130 of the pipe body 112, the flow channel 128 surrounded by the inner surface 124 of the wall 118.

FIG. 3 shows another exemplary embodiment of a pipe body 212 having one or more helical wire channels 216 formed within a wall 218 of the pipe body 212. The wall 218 includes an outer surface 222 and an inner surface 224, and the helical wire channels 216 are formed between the outer and inner surfaces 222, 224 of the wall 218. A thickness 226 is substantially uniform, such that an outer diameter of the pipe body 212 is substantially constant, and an inner diameter of the pipe body 212 is substantially constant. A flow channel 228 is provided within an interior 230 of the pipe body 212, the flow channel 228 surrounded by the inner surface 224 of the wall 218.

In each of the above-described embodiments, a wall surrounding the wire channel as well as the wall of the pipe body must be of sufficient thickness to provide the required strength for torsion, tension, vibration and abrasion while not exceeding the requirements for weight and dimensions (relating to losses in a circulation system). For example, in a 4" conventional drill pipe ("CDP"), the dimensions are approximately 102 mm at an outer diameter and 82 mm at an inner diameter, providing a 20 mm wall thickness. It has been determined, however, that for such a pipe to incorporate a wire channel 16, 116, 216 as shown in FIGS. 1-3, the pipe body 12, 112, 212, respectively, would require a wire channel wall thickness of approximately 10 mm. Thus, it is not sufficient to keep the dimensions of a CDP with an integrated wire channel. If a coax cable having, for example, a 2.5 mm outer diameter is to be incorporated into the pipe body, then the wall thickness will have to be increased to either radially expand into the interior of the pipe body 12 as shown in FIG. 1, expand radially outward from the pipe body 112 as shown in FIG. 2, or increase an overall thickness of the wall 218 of the pipe body 212 as shown in FIG. 3. Although not illustrated, another exemplary embodiment would be a combination of the pipe bodies 12, 112 shown in FIGS. 1 and 2 where a wire channel incorporates a wire channel wall that protrudes from both an outer surface and an inner surface of the wall, such that neither the inner nor the outer diameter of the pipe body is constant. While FIGS. 1-3 each illustrate a pair of wire channels 16, 116, 216, alternatively the pipe bodies 12, 112, 212 could be limited to a single channel, or may be provided with more than two channels. For a redundant system, the incorporation of more than one line should be considered, and therefore two or more wire channels 16, 116, 216 should be formed within the pipe bodies 12, 112, 212.

While the wire channels 16, 116, 216 could be drilled through a pipe body having walls of sufficient thickness by means of steerable drilling, this would require additional manufacturing steps with tight tolerances. To reduce the amount of manufacturing steps required to form the wired pipe, an exemplary method of manufacturing the pipe body includes extrusion of a metal material of which the pipe body is made, while forming the helical wire channels 16, 116, 216 directly therein during the extrusion process. The extrusion temperature may be about 1200° C., depending on the material for the pipe body 12, 112, 212. In order to insert a line at this production step, a line is needed that is able to withstand the temperatures during the production process. Thus, if the line is formed directly with the pipe body 12, 112, 212, then the line should be made of a material that can withstand the extrusion temperature, or alternatively be covered with an outer jacket made of a material that can protect the line either by withstanding the extrusion temperature, or melting at exposure of the extrusion temperature but providing a buffer between the extruded material of the pipe body 12, 112, 212 and the line. Alternatively, a wire conduit made of a material having a melting temperature greater than that of the extrusion temperature could be extruded with the pipe body 12, 112, 212, and the line subsequently inserted therein. While a material for the line or conduit has been described as having a melting temperature greater than that of the extrusion temperature, it could also be possible to form the pipe body if the melting temperature of the material of the line or conduit is a little bit below the melting temperature of the material of the pipe body, such as substantially the same, so long as the line or conduit can substantially withstand the extrusion process.

Figure 10:
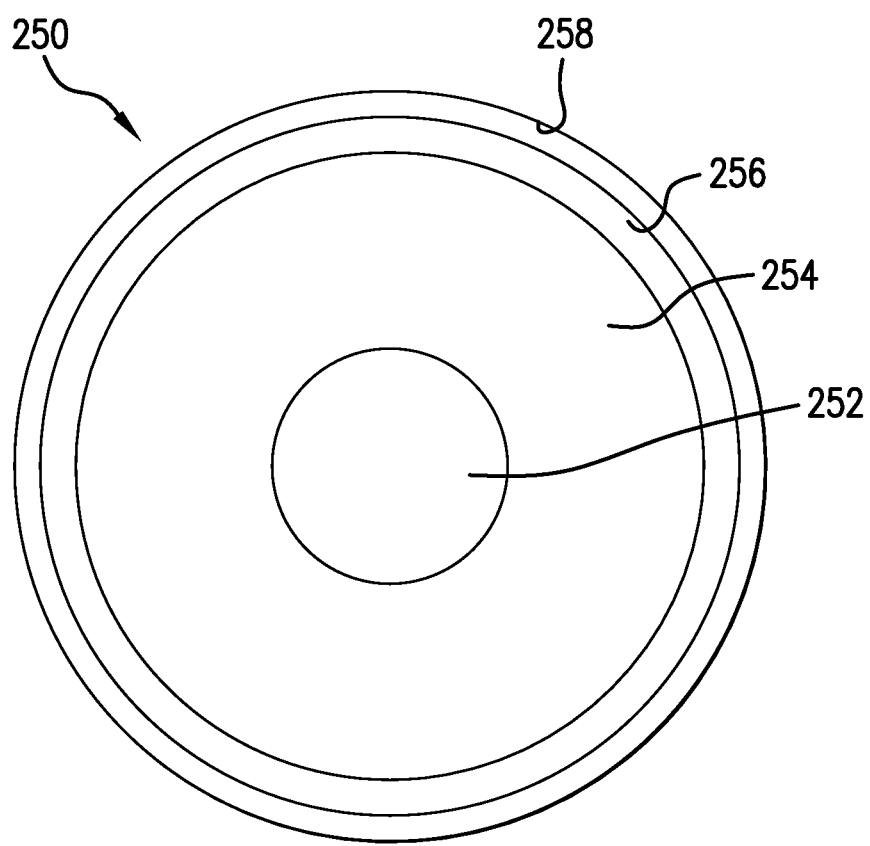
FIG. 10 shows a cross-sectional view of an exemplary embodiment of a transmission line for use in the wired pipe.

One exemplary embodiment of a cable 250 usable as a line suitable for use during an extrusion process of the wired pipe 10 is shown in FIG. 10. The exemplary cable 250 includes a conductor 252 which may be made of copper, such as oxygen free high thermal conductivity ("OFHC") copper. The conductor 250 is surrounded by an insulator 254, such as $SiO_2$ dielectric material, separating the conductor 250 from jacket 256, which may also be made of OFHC copper. The insulator 254, in particular the $SiO_2$ dielectric, has electrical properties that are approximately stable over the required manufacturing temperatures of the wired pipe 10. The line 250 is protected by an outer tube 258 providing a high range of performance temperatures and excellent mechanical resistance, such as a stainless steel or titanium. The materials for the line 250 may be radiation hardened and thermally stable, and the phase and insertion losses of the line 250 are low. Also, the $SiO_2$ cable 250, which has similar electrical properties of a PTFE cable, can be 30-50% smaller and lighter than PTFE cable, and greater thermal resistance than PTFE cable. The smaller size renders the cable 250 more suitable for use in the wall of pipe body 12, 112, 212. PTFE has a much lower melting temperature (less than 350° C.) than stainless steel (approximately 1500° C.) and titanium (approximately 1650° C.). Thus, the resultant cable 250 with its smaller dimensions and greater thermal resistance is suitable for extrusion within the wall 18, 118, 218 of the wired pipe 10.

Alternatively during the extrusion process, in lieu of extruding the line with the pipe body, the helical wire channels 16, 116, 216 could be extruded within the wall 18, 118, 218 of the pipe body 12, 112, 212 by a piercing rod and the line subsequently inserted therein. For exemplary purposes, an extrusion process for forming a wired pipe body 12 as shown in FIG. 1 will be described, where the pipe body 12 includes two helically arranged wire channels 16 which protrude radially inward towards the interior 30 of the pipe body 12. Similar processes may be performed to form the pipe bodies 112, 212 shown in FIGS. 2 and 3, as well as a pipe body including a single channel, or pipe bodies having more than two wire channels.

Figure 4:
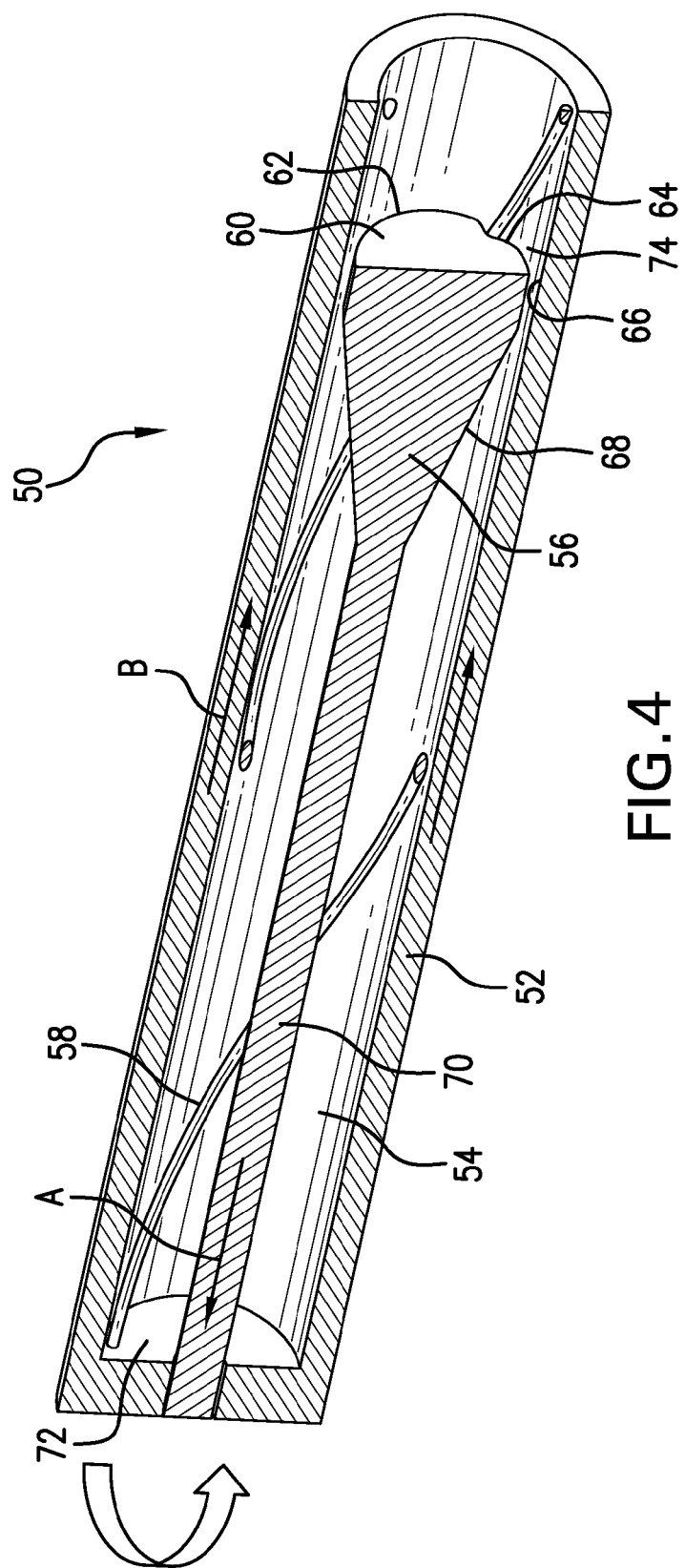
FIG. 4 shows a cutaway view of an exemplary embodiment of a manufacturing tool for forming a wired pipe.
Figure 5:
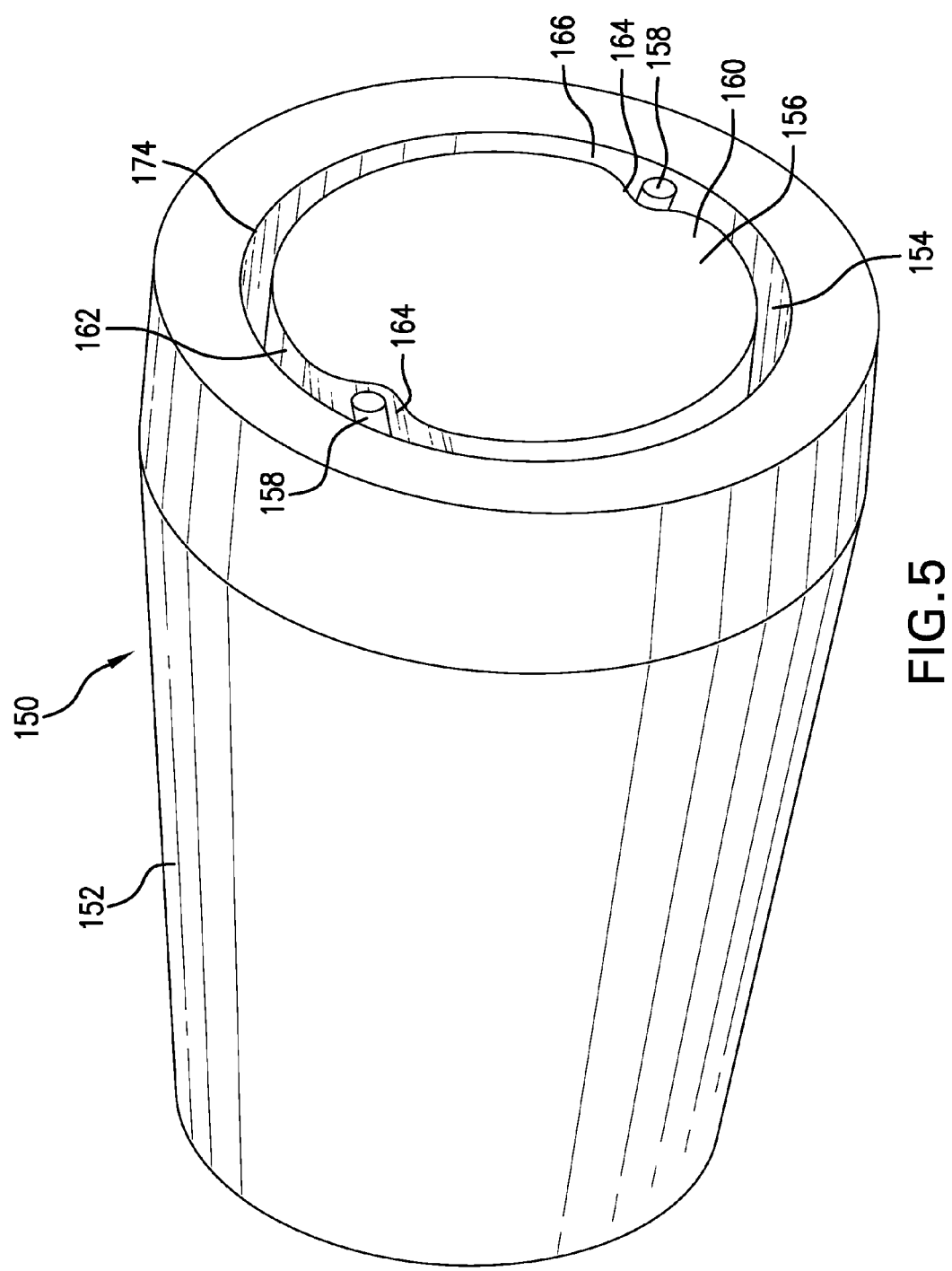
FIG. 5 shows a side perspective view of another exemplary embodiment of a manufacturing tool for forming a wired pipe.
Figure 6:
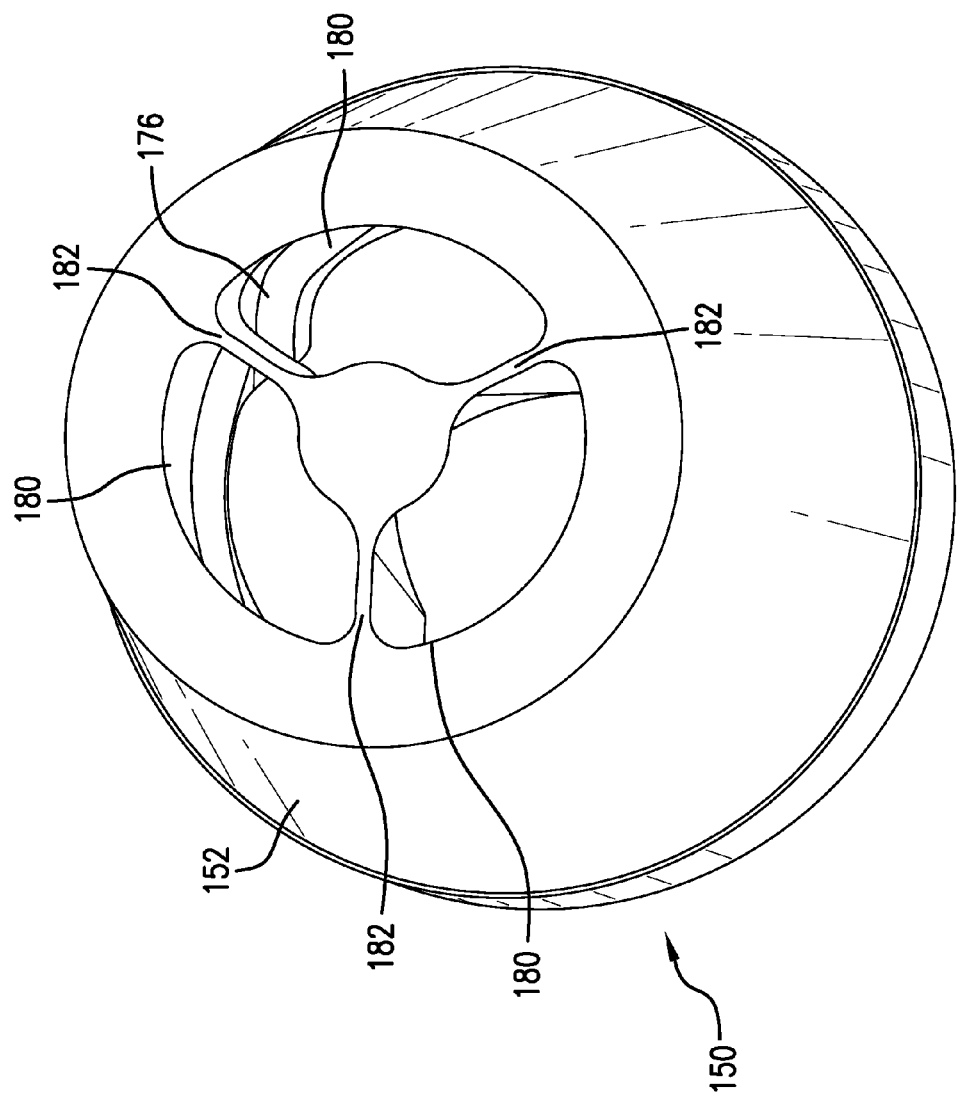
FIG. 6 shows an end perspective view of another exemplary manufacturing tool.

FIG. 4 illustrates a first exemplary embodiment of a manufacturing tool 50 for an extrusion process to form the pipe body 12 shown in FIG. 1. The tool 50 includes a housing 52 having an interior space 54 sized to hold raw material prior to the extrusion process. The tool 50 also includes an inner surface forming element, such as a first piercing rod 56, and first and second lines or conduits, or second and third piercing rods, represented at 58. The seamless wired pipe body 12 shown in FIG. 1 can be formed using the tool 50 by drawing a solid billet between the piercing rod 56 and the housing 52 to create the hollow shell of the pipe body 12. The piercing rod 56 forms the flow channel 28 of the pipe body 12. In lieu of cable or conduits 58 integrally formed with the pipe body 12, second and third piercing rods 58 for forming the wire channels 16 may be used in which case a line may subsequently be inserted. With respect to tension and torsional loads, a helical structure is beneficial so that the resulting load force is in the direction of the channel 28. Therefore piercing rods 58 for the wire channels 16 may be helically arranged as well. A first end 60 of the first piercing rod 56 has an outer surface 62 substantially the same size and shape as the inner surface 24 of the pipe body 12 to be formed. The outer surface 62 of the first end 60 is further provided with indentations 64 corresponding to the inward radial protrusions to be formed by the inner surface 24 at the wire channels 16. The outer surface 62 of the first end 60 of the piercing rod 56 and an inner surface 66 of the housing 52 form a die of the tool 50. The first piercing rod 56 may have a tapered section 68 extending from the first end 60. The tapered section 68 allows raw material within the housing 52 to be extruded into the final shape of the pipe body 12 defined in part by the die. The first piercing rod 56 further includes an extension portion 70 extending through the interior space 54 of the housing 52. The first piercing rod 56 is configured to rotate during the extrusion process to form the wall 18 to accommodate the helically arranged wire channels 16, such as via rotation of the extension portion 70. To extrude the billet or raw material placed in the interior space 54 of the housing 52 into the final shape of the pipe body 12 shown in FIG. 1, the piercing rod 56 may be drawn back in direction A towards the raw material disposed within the interior space 54 of the housing 52 and/or a ram 72 may push the billet or raw material in direction B towards an opposite end of the housing 52. In either case, the piercing rod 56 is rotated to allow the wire channel 16 to be created at the appropriate helical angle and the billet or raw material is extruded through the extrusion gap 74 between the first end 60 of the piercing rod 56 and the inner surface 66 of the housing 52. When the material of the new pipe body is congealed, the ends of piercing rods 58 are taken out. Therefore the pipe body has to be turned relative to the tool.

If the line is embedded in the pipe body during manufacturing of the pipe body 12, the line will be longer than what is shown at 58 in FIG. 4 to ensure adequate length for connection to other pipe bodies 12 and interconnecting couplers. A weak material with a low melting temperature, such as but not limited to wax, can be used to hold the line 58 in place before the tube material surrounds it during the extrusion process. In a subsequent process, the manufacturing tool 50 is cooled, such as via cooling channels in the housing 52 and/or the piercing rod 56, or via cooling baths or air supplies to prevent the hollow extruded pipe body 12 from collapsing and the manufacturing tool from melting abrasion and deformations.

Figure 7:
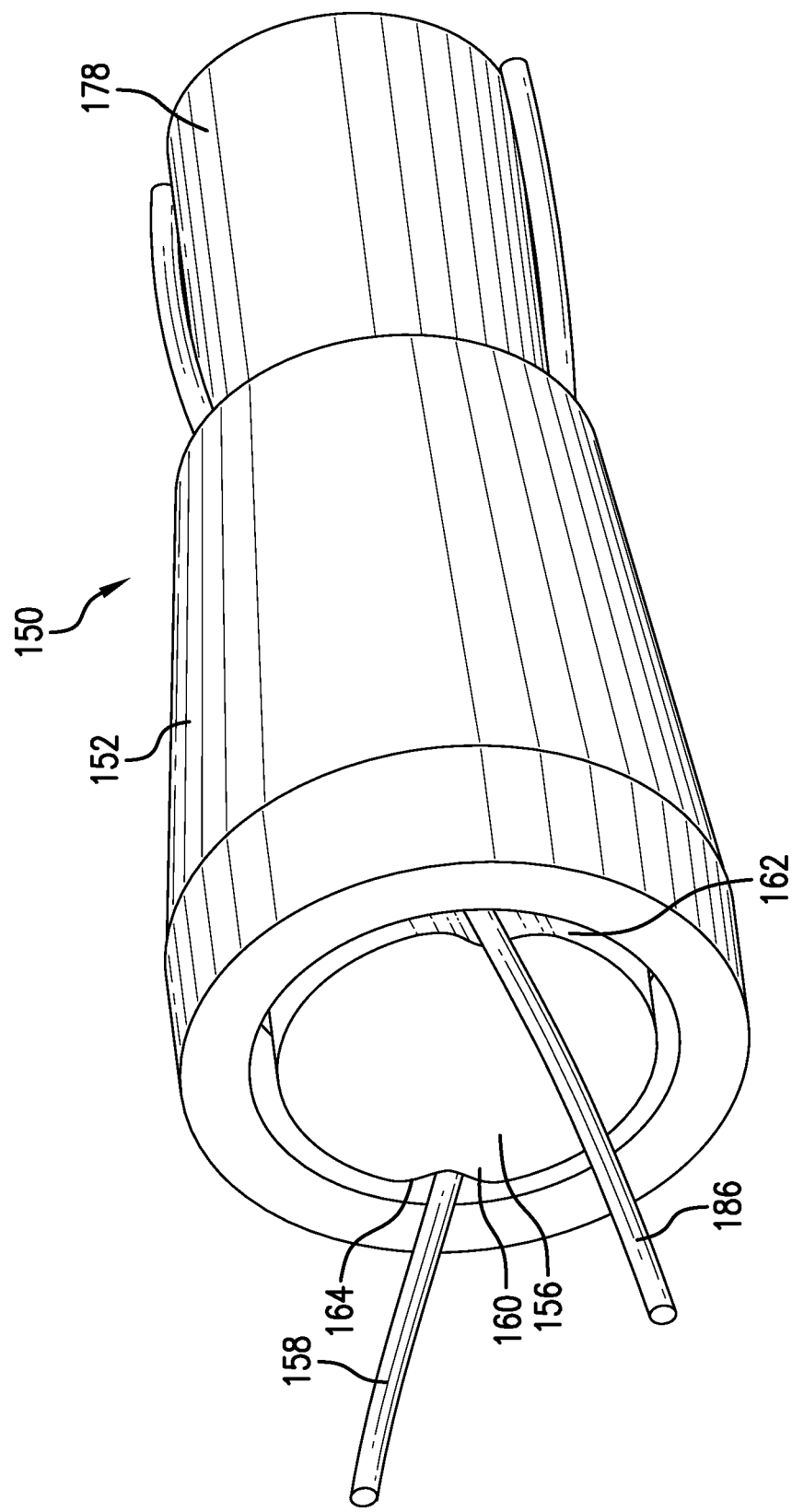
FIG. 7 shows a side perspective view of the manufacturing tool of FIG. 5.
Figure 8:
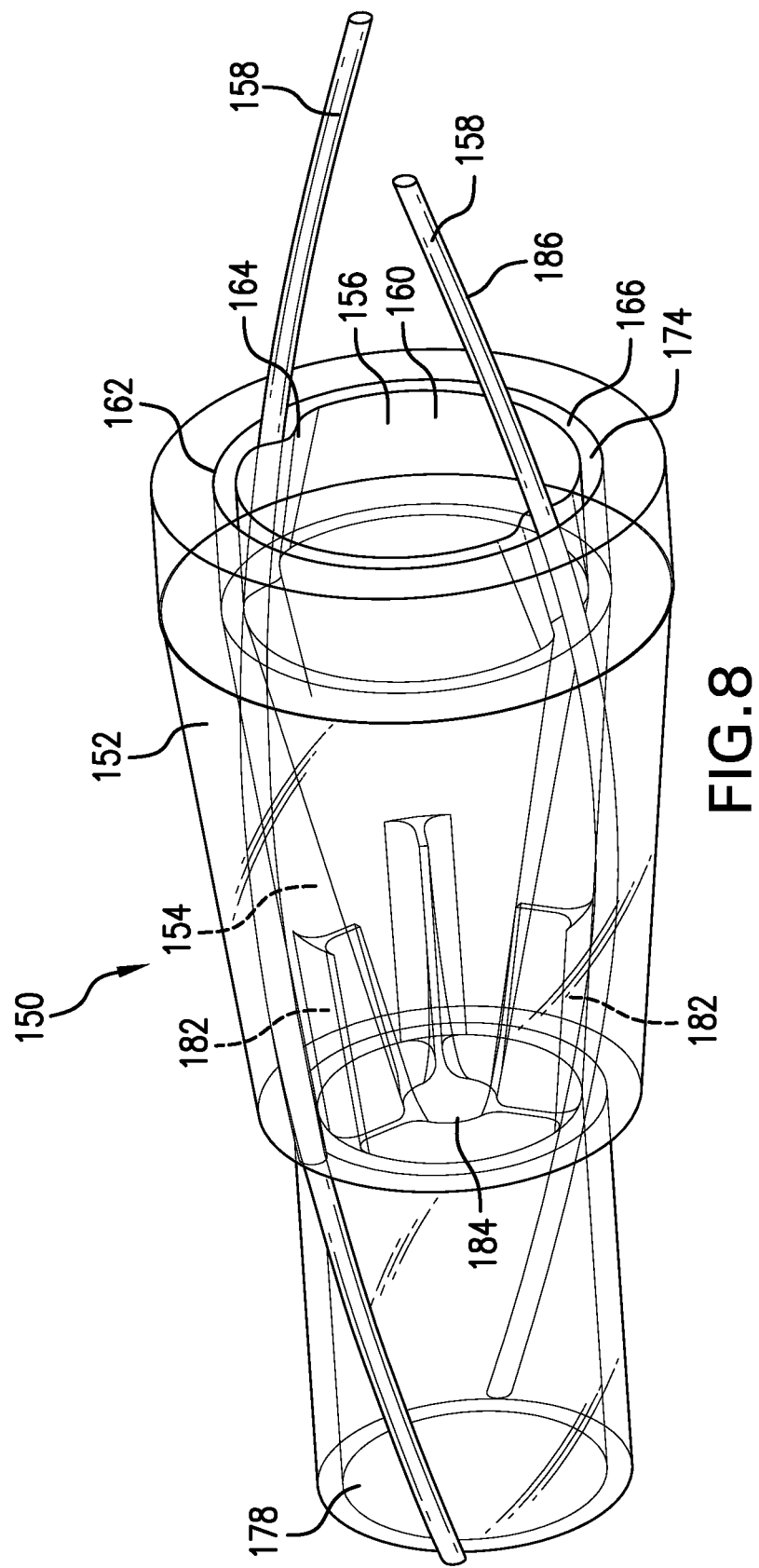
FIG. 8 shows a side perspective X-ray view of the manufacturing tool of FIG. 5.

Another exemplary embodiment of a manufacturing tool 150 for use in forming an integrated wired pipe body 12 is shown in FIGS. 5-8. The tool 150 is usable in an embodiment where the raw material is in a melted state prior to extrusion. The tool 150 includes a housing 152. An inlet 176 (FIG. 6) to an interior 154 of the housing 152 is arranged to receive melted raw material via a raw material introduction tube 178 (FIGS. 7 and 8). The inlet 176 includes apertures 180 sized to allow the entry of the raw material, as well as aperture support webs 182 extending into the interior 154 of the housing 152 and supporting an inner surface forming element, such as a mandrel 156, therein. For extrusion temperatures below the melting temperature, such apertures 180 typically are not connected to the housing 152 inside the path of the extrusion, but extend the full length of the manufactured pipe body. The mandrel 156 includes a first end 160 having an outer surface 162 similar to the outer surface 62 of the piercing rod shown in FIG. 4. The outer surface 162 of the first end 160 of the mandrel 156 may have indentations 164 to create the radially inward protruding wall 18 adjacent the ware channel 16 of the pipe body 12 shown in FIG. 1. The mandrel 156 is tapered towards a second end 184 (FIG. 8) of the mandrel 156, which ends at the inlet 176, to allow for room within the interior 154 of the housing 152 for the raw material. The lines 158 are introduced between the housing 152 and the raw material introduction tube 178, as shown in FIGS. 7 and 8. The lines 158 are provided with a connection portion 186 extending beyond the extruded pipe body 12 for subsequent connection with a joint or coupler, as will be further described below with respect to FIG. 9. An extrusion gap 174 is formed between the inner surface 166 of the housing 152 and the outer surface 162 of the first end 160 of the mandrel 156, such that the extruded pipe body 12 has an outer surface 22 matching the inner surface 166 of the housing 152 at the extrusion gap 174 and an inner surface 24 matching the outer surface 162 of the first end 160 of the mandrel 156. The housing 152 with mandrel 156 may be rotated relative to the raw material introduction tube 178 to helically arrange the lines 158 within the wall 18 of the pipe body 12. It should be understood that the rotation is a result of pressing the material through the helical structure of the tool. That is, there is no active rotation of the raw material. The extruded pipe body 12 is cooled following extrusion to retain the shape and structure of the extruded pipe body 12 exiting the tool 150.

Once the extruded pipe body 12 is cooled and includes the desired lines 158 (cables, wires, fibers, etc.), the wired pipe 10 is ready for connection to other wired pipes 10. This may be accomplished through the use of a coupler, such as the exemplary embodiment of a tool joint 80 depicted in FIG. 9. The tool joint 80 may be attached to an end of the helical channeled wired pipe 10, such as by welding, frictional welding, or other attachment methods. The joints 80 may be provided with bores 82 to pass the connection portions 186 of the lines 158 there through. The bores 82 may be gun drilled. The wired pipe 10 and joint 80 are aligned such that, at the final position of the welding process, the openings 84 to the bores 82 in the tool joint 80 and the openings 32 (FIG. 1) of the channel 16 for the line 158 in the pipe body 12 are aligned. Afterwards the end of the bores 82 could be re-drilled, if necessary. It is also possible to route the lines 158 through the channel 16 after finishing the channel 16 or to connect the wire in the pipe body 12 after re-drilling with another wire routed through the tool joint 80. Another option would be to drill the bores 82 through the tool joint 80 after attaching the tool joint 80 to the pipe body 12. In this case the final orientation of the tool joint 80 relative to the pipe body 12 after the attachment would not matter. After the pipe joints 80 are welded to the pipe body 12, couplers of the joints 80 connect additional line connection portions 186 from adjacent wired pipes 10 or other devices, such as but not limited to repeater electronics, sensors, actuators, to the line connection portions 186 extending from the wired pipe 10. The tool joint 80 may include a threaded end portion 86. The threaded end portion 86 may include male or female threads, and a tool joint (not shown) having the other of male or female threads can be connected to an opposite end of the wired pipe 10. The tool joint 80 also includes a flow channel 88 aligned with the flow channel 28 after connection to the wired pipe 10.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A wired pipe comprising:
   a tubular pipe body having a wall, the wall including an inner surface, a flow channel formed by the inner surface, an outer surface, and at least one channel integrally formed within a thickness of the wall and between the inner and outer surfaces of the wall;
   at least one transmission line disposed within the at least one channel, the at least one transmission line including at least one of an electrical conductor and an optical fiber, the at least one transmission line extruded with the pipe body;
   wherein the at least one channel has a helical shape extending helically from an end of the tubular pipe body and the at least one transmission line extending at least a length of the at least one channel.

2. The wired pipe of claim 1, wherein the at least one channel includes at least one helical turn.

3. The wired pipe of claim 1, wherein the at least one channel is isolated from the flow channel by the wall of the tubular pipe body.

4. The wired pipe of claim 1, wherein the at least one channel is extruded with the pipe body.

5. The wired pipe of claim 1, wherein the inner surface of the wall adjacent the at least one channel protrudes radially inward.

6. The wired pipe of claim 1, wherein, within a cross-section of the wired pipe, a distance between the outer surface and the at least one channel is substantially equal to a distance between the inner surface and the at least one channel.

7. The wired pipe of claim 1, wherein the at least one channel extends an entire length of the pipe body.

8. The wired pipe of claim 1, wherein the wired pipe is a downhole drill pipe, and further comprising a tool joint attached to the drill pipe, the tool joint having at least one longitudinal bore aligned with the at least one channel.

9. A wired pipe comprising:
   a tubular pipe body having a wall, the wall including an inner surface, a flow channel formed by the inner surface, an outer surface, and at least one channel integrally formed within a thickness of the wall and between the inner and outer surfaces of the wall;
   at least one transmission line disposed within the at least one channel, the at least one transmission line including at least one of an electrical conductor and an optical fiber the at least one transmission line extruded with the pipe body;
   wherein a melting temperature of at least an outer tube of the at least one transmission line is substantially equal to or greater than a melting temperature of a material of the pipe body.

10. The wired pipe of claim 9, wherein the at least one transmission line includes an outer tube of stainless steel or titanium.

11. The wired pipe of claim 10, wherein the at least one transmission line includes a $SiO_2$ dielectric.

12. A method of forming a wired pipe, the method comprising:
    extruding a tubular pipe body with a wall having an outer surface and an inner surface, the inner surface forming an interior flow channel; and,
    forming at least one channel through a thickness of the wall of the tubular pipe body, between the inner and outer surfaces;
    wherein extruding the tubular pipe body includes extruding material for the tubular pipe body between a housing and an inner surface forming element, and further comprising inserting at least one transmission line or conduit between the housing and inner surface forming element to form the at least one channel.

13. The method of claim 12 wherein forming the at least one channel includes forming the at least one channel in a helical shape.

14. The method of claim 12, further comprising inserting at least one transmission line through the at least one channel.

15. The method of claim 12, wherein forming at least one channel includes extruding the at least one channel substantially simultaneously with extruding the tubular pipe body.

16. The method of claim 15, further comprising subsequently inserting at least one transmission line within the at least one channel.

17. The method of claim 15, wherein extruding the at least one channel includes inserting at least one transmission line within the wall of the tubular pipe body during extrusion.

18. The method of claim 12, further comprising temporarily adhering the at least one transmission line or conduit between the housing and inner surface forming element using a material having a lower melting temperature than the material for the pipe body.

19. The method of claim 12, wherein the inner surface forming element includes at least one indentation, and further comprising rotating the inner surface forming element relative to the material during extruding the tubular pipe body to form at least one radial protrusion for the at least one helical channel.

20. The method of claim 12, further comprising including at least one transmission line within the at least one channel, a portion of the at least one transmission line extending beyond an end of the pipe body, connecting a tool joint to the pipe body, and passing the portion of the line that extends beyond the end of the pipe body through the tool joint.

\* \* \* \* \*